C. E. ARNOLD.
ACCOUNT BOOK.
APPLICATION FILED OCT. 22, 1912.

1,074,922.

Patented Oct. 7, 1913.

WITNESSES:
Sams Lucia
O. S. Eaton

INVENTOR.
Charles E. Arnold
BY
Arthur B. Jenkins,
ATTORNEY.

UNITED STATES PATENT OFFICE.

CHARLES E. ARNOLD, OF HARTFORD, CONNECTICUT.

ACCOUNT-BOOK.

1,074,922.

Specification of Letters Patent.

Patented Oct. 7, 1913.

Application filed October 22, 1912. Serial No. 727,238.

*To all whom it may concern:*

Be it known that I, CHARLES E. ARNOLD, a citizen of the United States, and a resident of Hartford, in the county of Hartford and State of Connecticut, have invented a new and Improved Account-Book, of which the following is a specification.

My invention relates to that class of books in which the financial transactions of a business concern are entered, and an object of my invention, among others, is to produce a simplified means for keeping a record of such transactions.

One form of device embodying my invention and in the construction and use of which the above object, as well as others, may be attained, is illustrated in the accompanying drawings in which—

Figure 1:
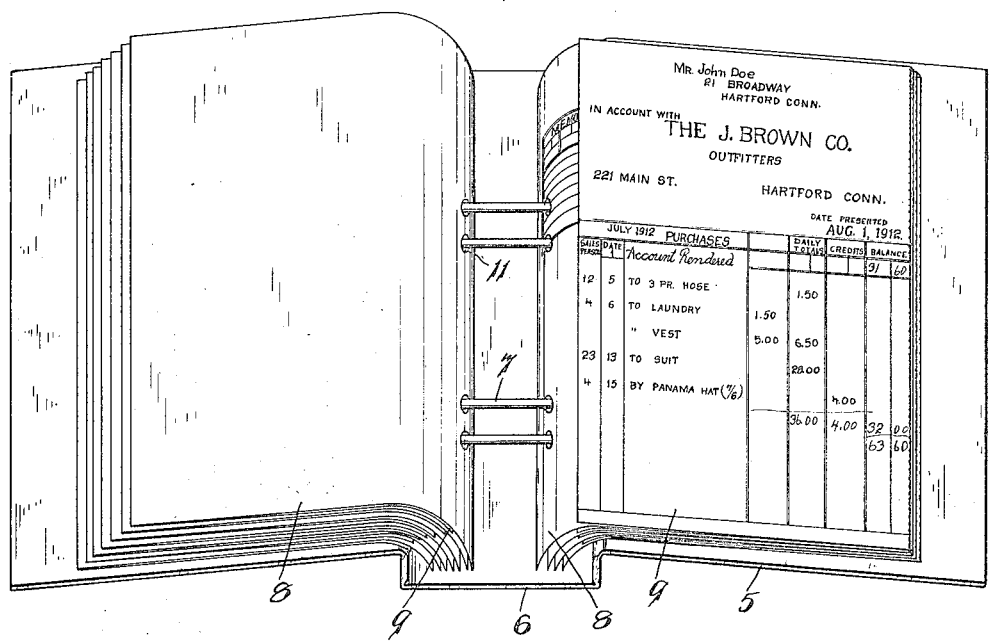
Figure 2:
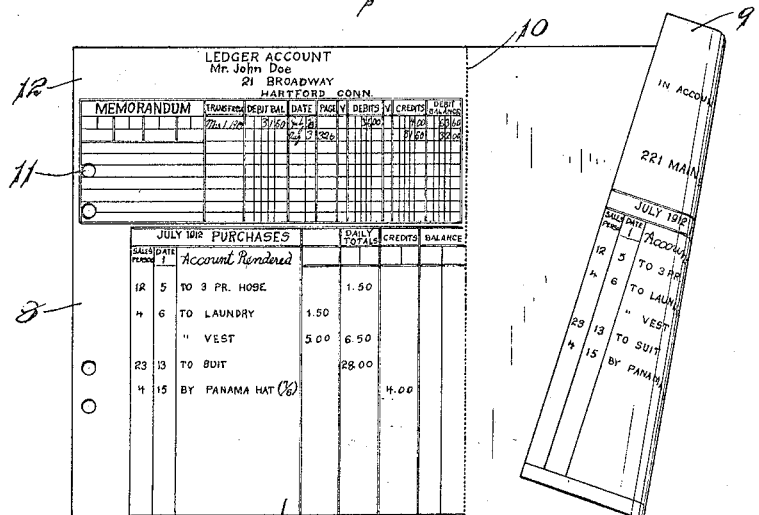

Figure 1 is a perspective view of a loose leaf binder containing account sheets embodying my invention. Fig. 2 is a detail view illustrating one of said sheets opened out.

In the accompanying drawings the numeral 5 denotes the covers of a loose leaf binder and 6 the back thereof, this binder being provided with pins 7 all of which may be of any well known form and construction common to what are known as loose leaf binders.

My invention resides in the construction and arrangement of the sheets contained in such binder, which sheets are each formed in two sections, an account section 8 and a bill section 9. These two sections are divided one from the other by an indented or perforated line 10 of any well known construction, and by means of which the two sections of the sheet may be separated. Perforations 11 are formed in the account section 8 by means of which it is secured on the pins 7, and this account section is divided into a ledger account and a day-book account, each of which are properly ruled for the entries usual to such accounts.

The bill section 9 is ruled, as to its lower portion, to correspond with the ruling of the day-book section of the leaf 8, the perforations of the indented line 10 being so formed that the ruling of the bill section, when that section is superposed on the account section, will register with or exactly overlie the like ruling of the day-book account. The upper part of the bill section may bear printed matter common to bills, and it will be noted that the bill section is narrower than the account section, to which it is secured, so that its edge will not interfere with the pins 7.

In use, a sheet of transfer paper is placed between the folds composing an account and bill section, and each day's transactions of an account are entered on the bill, the bill, in fact, being the initial entry. These amounts are by the action of the transfer sheet simultaneously transferred to the day-book account of the immediately underlying account section or sheet. The entries on the bill are usually made at the end of each day, and at the end of the month the bill is separated from the account section and forwarded to its destination. The proper transfers are then made from the day-book account 13 of the account section to the ledger account 12 immediately over it at the top of the sheet composing the account section. It will be noted that this arrangement utilizes what would otherwise be waste space at the top of the account section and immediately underlying the heading of the bill at the top of the bill section.

By locating the ledger and day-book accounts on a single sheet not only is the liability to error minimized but the two accounts always being together the items of the ledger account may be readily determined at any time and the trouble of a search of one of a number of books to determine this is avoided as the arrangement preserves always the itemized account with its corresponding ledger account.

It will be noted that the space for the name of the ledger account immediately underlies the space provided for the name of the person with whom the account is to be opened, which latter space is at the top of the bill section, so that when the bill is made out the ledger account is simultaneously opened and headed, and this is a great saving in the time of the bookkeeper otherwise necessarily employed for making the ledger headings. In the drawings herein, the account having been shown as opened, this space, which is originally blank, has been supplied at the top of the bill and account sheets with the name "Mr. John Doe, 12 Broadway, Hartford, Conn."

I claim—

1. In an account sheet, a bill section including a bill heading and a ruling for an account on the same sheet, and an account section having a ledger ruling immediately underlying and in registration with the heading of the bill section.

2. In an account sheet, a bill section having a heading at one end and an account ruling at the opposite end and an account section having an account ruling a duplicate of that of the bill section and immediately underlying the ruling section and in registration therewith, and a ledger account ruling immediately underlying the heading of the bill and in registration therewith, the bill section and account section being separable one from the other.

3. In an account sheet, a bill section having a heading at one end including a blank for designating the account and an account ruling at the opposite end, and an account section having an account ruling a duplicate of that of the bill section and immediately underlying the ruling of the bill section and in registration therewith and a ledger account ruling immediately underlying the heading of the bill and in registration therewith and with a blank space over the ledger heading and immediately underlying and in registration with the blank space on the bill heading for the name designating the account.

CHARLES E. ARNOLD.

Witnesses:
ANNE E. O'BRIEN,
ARTHUR B. JENKINS.